United States Patent [19]

Morris et al.

[11] Patent Number: 5,458,860

[45] Date of Patent: Oct. 17, 1995

[54] METHOD FOR REMOVING ALKALINE SULFATE SCALE

[75] Inventors: Richard L. Morris, Duncanville; James M. Paul, Desoto, both of Tex.

[73] Assignee: Mobil Oil Corporation, Fairfax, Va.

[21] Appl. No.: 303,907

[22] Filed: Sep. 9, 1994

Related U.S. Application Data

[63] Continuation-in-part of Ser. No. 161,178, Dec. 1, 1993, abandoned, which is a continuation of Ser. No. 892,876, Jun. 3, 1992, abandoned.

[51] Int. Cl.⁶ .......................... C01F 1/00; C22B 26/00; B08B 7/00; E21B 37/00
[52] U.S. Cl. .......................... 423/155; 423/658.5; 134/1; 166/311; 166/249
[58] Field of Search .................. 423/658.5, 155; 134/1; 166/249, 311; 252/8.552; 203/7

[56] References Cited

U.S. PATENT DOCUMENTS

| | | | |
|---|---|---|---|
| 3,105,779 | 10/1963 | Bulat | 134/1 |
| 3,648,769 | 3/1972 | Sawyer | 166/311 |
| 3,956,164 | 5/1976 | Walker et al. | 252/180 |
| 3,970,146 | 7/1976 | Keenan, Jr. | 166/312 |
| 4,280,557 | 7/1981 | Bodine | 166/311 |
| 4,320,528 | 3/1982 | Scharton et al. | 376/310 |
| 4,372,787 | 2/1983 | Fields et al. | 134/1 |
| 4,683,556 | 7/1987 | Willis | 367/27 |
| 4,980,077 | 12/1990 | Morris et al. | 252/82 |

*Primary Examiner*—Steven Bos
*Attorney, Agent, or Firm*—Alexander J. McKillop; George W. Hager, Jr.; Lawrence O. Miller

[57] ABSTRACT

The present invention relates to the use of low frequency sonic energy within the range of 1.25 to 6.5 KHz, preferably less than 2.0 KHz and most preferably 1.25 KHz, for enhancing the dissolution of alkaline earth metal scales from well bores using a scale-removing solvent comprising an aqueous alkaline solution having a pH of about 8 to about 14 and containing EDTA or DTPA and a catalyst or synergist, preferably an oxalate anion. When the scale deposit is contacted with the scale removing solvent while simultaneously transmitting low frequency sonic energy through the solvent, substantially more scale is dissolved at a faster rate than previously possible.

9 Claims, 10 Drawing Sheets

METHOD FOR REMOVING ALKALINE SULFATE SCALE

CROSS-REFERENCE TO RELATED APPLICATIONS

This application is a continuation-in-part of Ser. No. 08/161,178, filed Dec. 1, 1993, now abandoned, which is a continuation of Ser. No. 07/892,876, filed Jun. 3, 1992, now abandoned, and is also related to prior application Ser. Nos. 07/745,779, filed Aug. 16, 1991, now U.S. Pat. No. 5,183,112 ; 07/610,737, filed Nov. 9, 1990, now U.S. Pat. No. 5,049,297, and 07/493,165, filed Mar. 14, 1990, now U.S. Pat. No. 5,026,481, of the same inventors.

FIELD OF THE INVENTION

This invention relates to the use of low frequency sonic energy for enhancing the dissolution of alkaline earth metal scale, particularly strontium and barium sulfate scale, from surfaces with scale deposits on them using a scale-removing solvent. It is particularly useful for the removal of such scale from oil field equipment including downhole pipe, tubing and casing as well as subterranean formations. It is also applicable to the removal of these scale deposits from other equipment such as boilers and heat exchangers.

BACKGROUND OF THE INVENTION

Many waters contain alkaline earth metal cations, such as barium, strontium, calcium, magnesium and anions, such as sulfate, bicarbonate, carbonate, phosphate and fluoride. When combinations of these anions and cations are present in concentrations which exceed the solubility product of the various species which may be formed, precipitates form until the respective solubility products are no longer exceeded. For example, when the concentrations of the barium and sulfate ions exceed the solubility product of barium sulfate, a solid phase of barium sulfate will form as a precipitate. Solubility products are exceeded for various reasons, such as evaporation of the water phase, change the pH, pressure or temperature and the introduction of additional ions which can form insoluble compounds with the ions already present in the solution.

As these reaction products precipitate on the surfaces of the water-carrying or water-containing system, they form adherent deposits or scale. Scale may prevent effective heat transfer, interfere with fluid flow, facilitate corrosive processes, or harbor bacteria. Scale is an expense problem in any industrial water system, in production systems for oil and gas, in pulp and paper mill systems, and in other systems, causing delays and shutdowns for cleaning and removal.

In our U.S. Pat. Nos. 4,980,077, 4,990,718, 5,049,297 and 5,084,105, there is disclosed a method for removing barium sulfate and other sulfate scales by a solvent comprising a combination of a chelating agent comprising a catalyst or synergist comprising polyaminopolycarboxylic acid such as EDTA or DTPA together with anions of (1) a monocarboxylic acid such as acetic acid, hydroxyacetic acid, mercaptoacetic acid or salicylic acid; (2) oxalates; (3) thiosulfates or (4) nitriloacetic acid. The scale is removed under alkaline conditions, preferably at pH values of about 8.0 to about 14.0, with best results being achieved at about pH 12. When the solvent becomes saturated with scale metal cations, the spent solvent is disposed of by re-injection into the subsurface formation or regenerated.

It is common practice when using scale dissolvers to pump a slug or volume of solvent into the well and leave it to stand static for a long period of time. This is not effective from an economic stand point because the well must be shut in for long periods of time, resulting in loss of production. Soaking is also not an efficient method from a reaction rate standpoint. Also, circulating scale solvent into the well bore is too costly, due to the large volume of solvent needed to fill the tubing and allow circulation.

This invention provides an effective method for removing alkaline earth metal scales by contacting the scale with a scale-removing solvent while simultaneously transmitting sonic energy through the solvent having a low frequency to more effectively dissolve the scale.

SUMMARY OF THE INVENTION

A method for removing alkaline earth sulfate scale comprising contacting the scale with an aqueous solution having a pH of about 8 to about 14 and comprising a chelating agent comprising a polyaminopolycarboxylic acid present in a concentration of from 0.1M to 1.0M or salt of such an acid and a synergist or catalyst and simultaneously transmitting sonic energy through the solvent having a low frequency, in the range of 1.25 to 6.5 KHz, preferably less than 2.0 KHz and most preferably 1.25 KHz. The preferred synergist or catalyst is the oxalate anion but other synergists may also be used including monocarboxylate acid, thiosulfate or nitriloacetic acid synergists. The concentration of the synergist or catalyst is in the range of 0.1M to 1.0M.

DESCRIPTION OF THE PREFERRED EMBODIMENT

According to the present invention, alkaline earth sulfate scales, especially barium sulfate, calcium sulfate and strontium sulfate scale, are removed by use of chemical scale-removing agents subjected to low frequency sonic energy, preferably less than 2.0 KHz and most preferably 1.25 KHz.

The method is particularly useful for the removal of such scale from oil field equipment used to bring oil and/or water from subterranean formations to the surface. The method may, however, also be used to remove scale from the formations themselves, especially in the regions surrounding production and injection wells. Scales and deposits can form to such an extent that the permeability of the formation is impaired resulting in lower flow rates, higher pump pressures, and ultimately abandonment of the well. The method may also be used to remove scale from above-ground equipment both in the oil field and elsewhere, for example, from boilers and heat exchangers and other equipment exposed to scale-forming conditions.

The scale itself is usually in the form of an adherent deposit of the scale-forming mineral on metal surfaces which have been exposed to the water containing the scale-forming components. These components comprise alkaline earth metals including calcium strontium and barium, together with variable amounts of radium, depending upon the origin of the waters. Barium sulfate scale is particularly difficult to remove by existing chemical methods in view of its very low solubility.

The present invention removes the scale deposits with an aqueous solvent comprising a chelating agent and a catalyst or synergist to speed up the dissolution of the scale as disclosed in U.S. Pat. No. 4,980,077, referenced above, which issued on Dec. 25, 1990 to J. M. Paul and R. L. Morris while simultaneously transmitting low frequency sonic energy through the solvent. This patent is hereby incorporated by reference. The pH of the solvent is maintained at pH values of about 8.0 to about 14.0, preferably at about 11 to 13, and preferably about 12. Suitable chelating agents comprise polyaminopolycarboxylic acid such as EDTA or DTPA which is intended to form a stable complex with the cation of the alkaline earth scale forming material. The chelant may be added to the solvent in the acid form or, alternatively, as a salt of the acid, preferably the potassium salt. The concentration of the chelant in the aqueous solvent should normally be in the range of 0.1M to 1.0M. The concentration of the catalyst or synergist in aqueous solvent will also be in the range of 0.1M to 1.0M. In any event the alkaline conditions used in the scale removal process will convert the free acid to the salt.

The preferred synergist or catalyst is the oxalate anion as described in our U.S. Pat. No. 4,980,077 referenced above. The oxalate is preferably used in an amount of about 0.1 to 1.0M, preferably about 0.5M, with a pH of 8.0 to 14.0, preferably 11 to 13, and usually about 12. The desired pH value is obtained by the addition of a base, preferably a potassium base such as caustic potash, potassium hydroxide. An alternative synergist or catalyst is a monocarboxylic acid anion, preferably salicylate, as described in our U.S. Pat. No. 5,084,105, referenced above, which issued Jan. 28, 1992, which patent is hereby incorporated by reference. The thiosulfate or nitriloacetic acid synergists described in our U.S. Pat. No. 5,049,297, referenced above, issued Sep. 17, 1992, may also be used which patent is hereby incorporated by reference. The amounts of the chelant used with the monocarboxylic acid and other synergists are comparable to the amounts used with the oxalate synergists and comparable solution pH volume are also used, i.e. chelant and synergist concentration from 0.1 to 1.0M, usually about 0.5M, solution pH from 8 to 14, usually 11 to 13 and for best results, about 12.

The preferred solvents comprise about 0.1 to about 1.0M of ethylenediaminetetraacetic acid (EDTA) or diethylenetriaminepentaacetic acid (DTPA), or salts of these acids, as a chelant. In addition, the preferred oxalate catalyst is added to the aqueous solution in about 0.1 to about 1.0, preferably about up to 0.5M. The pH of the solvent is then adjusted by the addition of a base to the desired value, preferably to about pH 12. We have found that it is important to avoid the use of sodium cations when operating at high pH values, about pH 8, and instead, to use potassium or, alternatively, cesium as the cation of the scale-removing agent. Potassium is preferred for economy as well as availability. Thus, the normal course of making up the solvent will be to dissolve the chelant and the oxalic acid (or potassium oxalate) in the water to the desired concentration, after which a potassium base, usually potassium hydroxide is added to bring the pH to the desired value of about 12. This aqueous composition can be used to remove scale from the equipment, or alternatively, pumped into the subterranean formation when it is the formation which is to be subject to descaling while in both cases simultaneously transmitting sonic energy having a low frequency through the solvent.

The mode of operation of the synergist or catalyst is not presently understood. While not desiring to be bound to a particular theory concerning the actual mechanism of its activity in converting or dissolving the scale, it is believed that adsorption of the synergist or catalyst on the barium sulfate surface may modify the surface crystal structure in such a way that the barium in the modified crystal is easily removed by the chelating agent.

The aqueous solution containing the composition can be directed down a wellbore to remove barium sulfate scale which has fouled the tubular equipment e.g. piping, casing etc., and passage ways. Prior to being directed into the wellbore, the composition may be heated to a temperature between about 25° C. to about 100° C., although the temperatures prevailing downhole may make pre-heating unnecessary. Once within the tubular goods and the passageways requiring treatment, sonic vibrations having a low frequency in the range of 1.25 to 6.5 KHz, preferably less than 2.0 KHz and most preferably 1.25 kHz, are transmitted through the solvent. The low frequency sonic energy is generated by a suitable source containing a vibrator or transducer driven by electrical power that is lowered down the wellbore into the solvent. A suitable sonic energy source is manufactured under the trade designation "T"-Motor™ by Sonic Research Corporation that generates sonic vibrations having a frequency within the range of 1.25 to 6.5 KHz. The low frequency sonic energy excitation of the scale-removing solvent enables the solvent to more effectively dissolve the scale. Although it is not presently understood the mechanism of how low frequency sonic energy more effectively enables the solvent to dissolve the scale, it is believed that the sonic energy breaks the scale into smaller particles and also agitates the solvent to create a flushing action by the solvent relative to the scale. After the solvent remains in contact with the equipment for the desired time, the sonic energy is discontinued and the solvent containing the dissolved scale is produced to the surface and may be disposed of as required, possibly by re-injection into the subsurface formation. This procedure can be repeated as often as required to remove scale from the equipment.

In order to demonstrate the use of low frequency sonic energy for enhancing the scale dissolving capacities of scale-removing solvents, various aqueous solutions have been tested in laboratory tests the results of which are described in the discussions which follow. The experiments described below were carried out in cylindrical glass vessels. Barium sulfate or, when applicable, other sulfates or solid scale components, were agitated with the selected solvents while simultaneously transmitting sonic energy through the solvent having frequencies in the range of 1.5 to 6.5 KHz, preferably less than 2.0 KHz and most preferably 1.25 KHz, and the rates of dissolution and final dissolved concentrations determined. These tests were repeated with the same solvents without the use of sonic energy. The results are reported graphically in the Figures.

Figure 1:
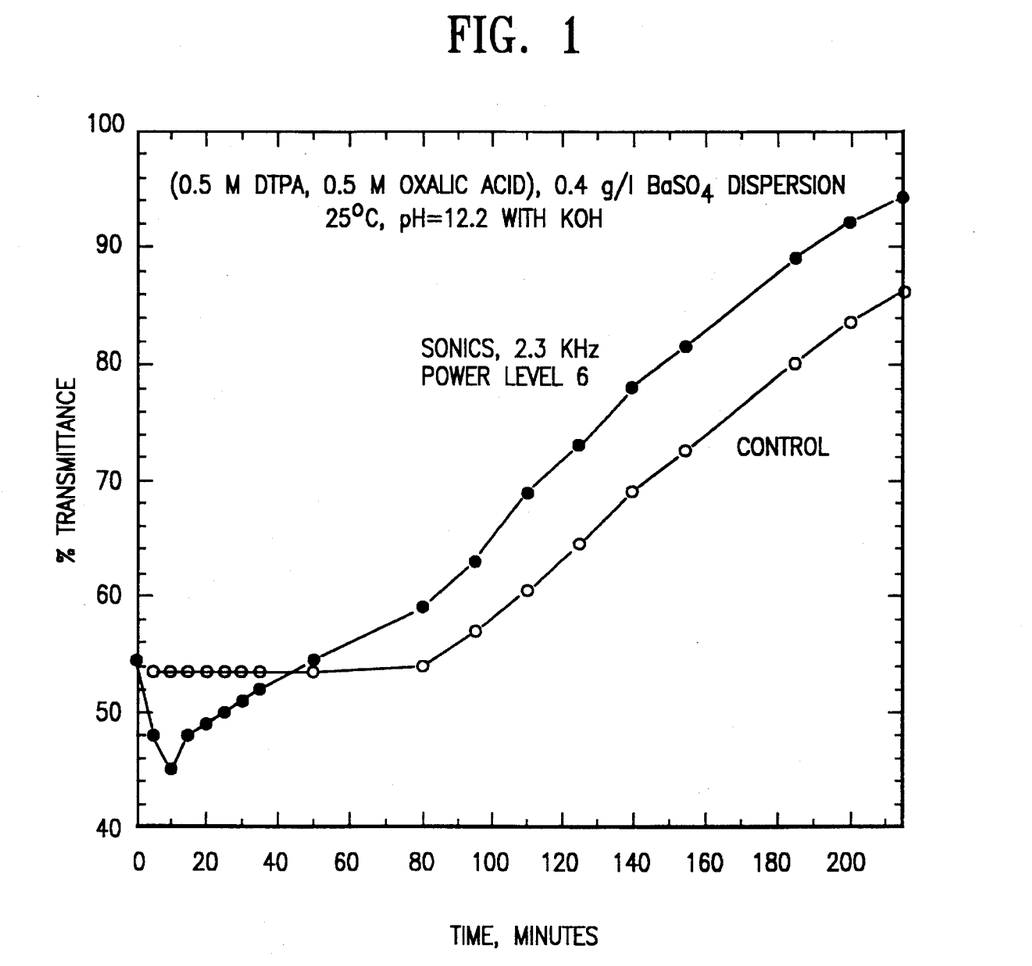
FIGS. 1–4 illustrates the rate of dissolution of barium sulfate using a solvent containing 0.5M DTPA and 0.5M oxalic acid at a pH of 12.2 while simultaneously transmitting sonic energy through the solvent having various low frequencies and a power level of 6 (60% of power).
Figure 2:
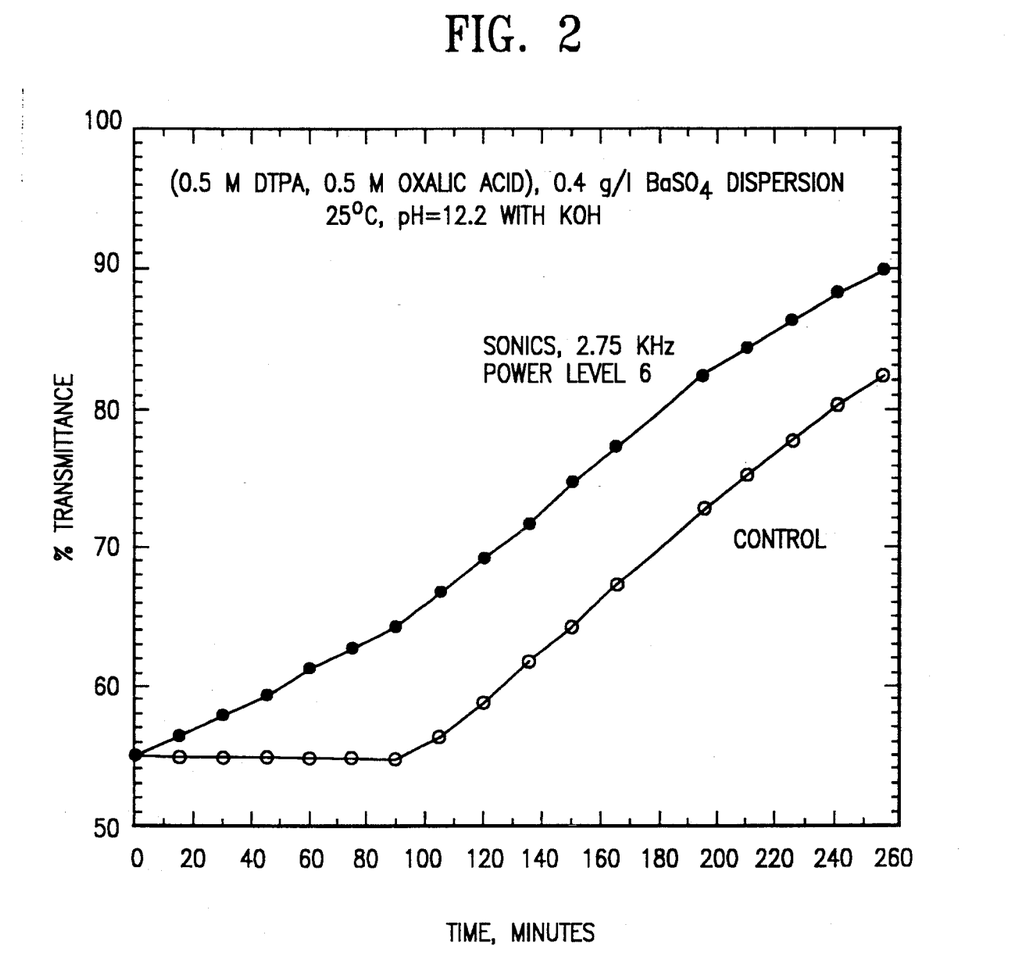
Figure 3:
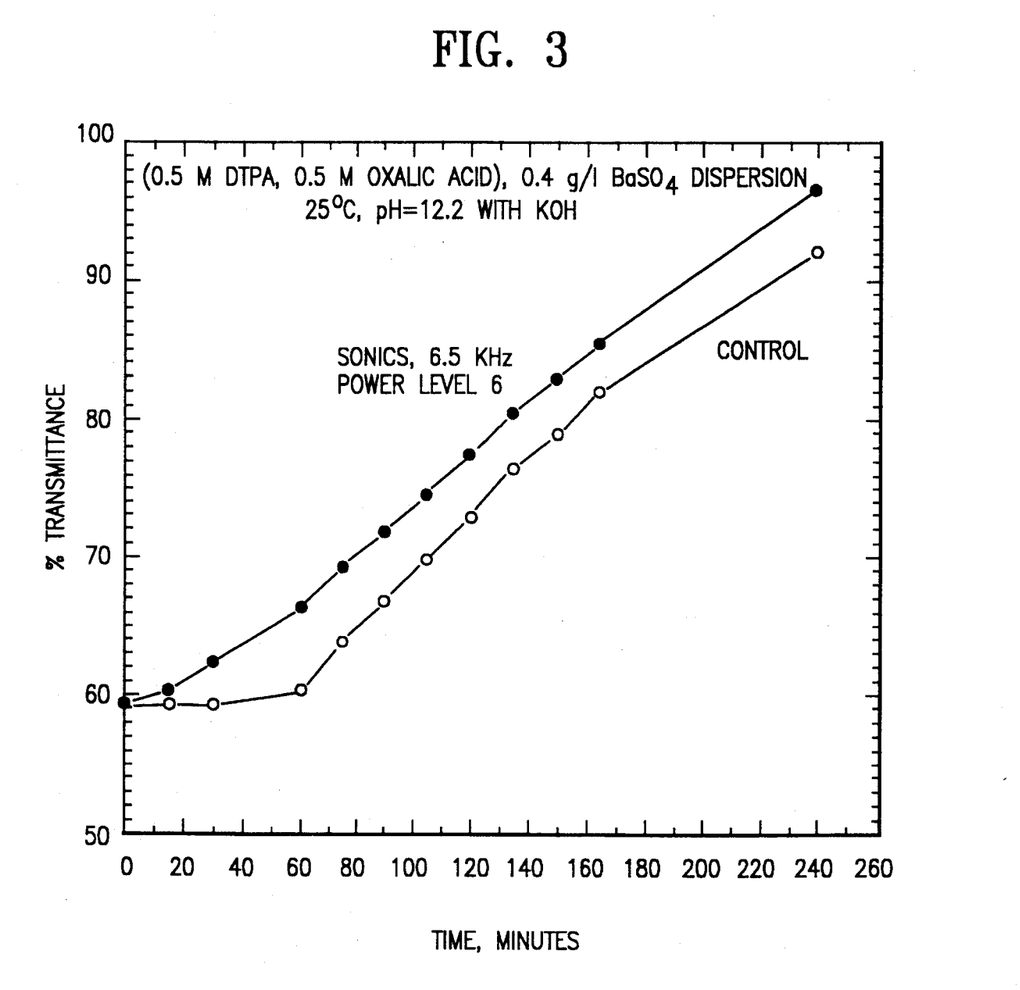
Figure 4:
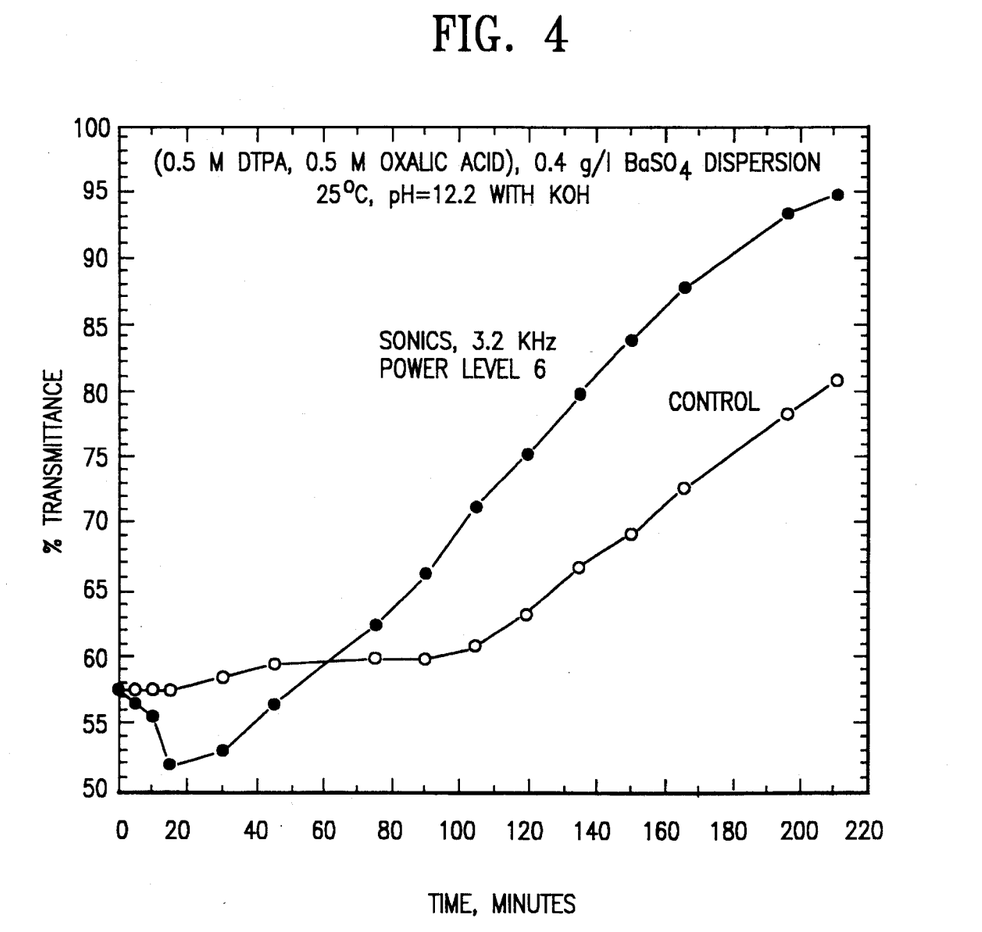

As shown in FIGS. 1 to 4, the rate of dissolution of barium sulfate using an aqueous solvent containing 0.5 M DTPA and 0.5M oxalic acid at a pH of 12.2 and a temperature of 25° C. while simultaneously transmitting various low frequencies of sonic energy through the solvent at a power level of 6 (60% of power), is compared to the rate of dissolution using the same solvent without sonic energy (control). The rate of dissolution of barium sulfate in the solution is measured by the percent (%) transmittance of the dispersed barium sulfate scale contained in the solvent to light. The percent (%) transmittance of light increases in proportion to the amount of barium sulfate dissolved by the solvent. As shown in FIGS. 1 and 4, initially, percent (%) transmittance decreases (number of particle and/or surface area increases) for a short length of time and then it begins to increase at a higher rate. The reduction in percent (%) transmittance is believed to be a result of breaking apart agglomerations of barium sulfate crystals. The lower percent (%) transmittance is not observed in dispersions of barium sulfate in the absence of sonic energy. The results demonstrate that when sonic energy is transmitted through the solvent, there is a significant increase in the rate of dissolution of barium sulfate and the amount of barium sulfate dissolved.

Figure 5:
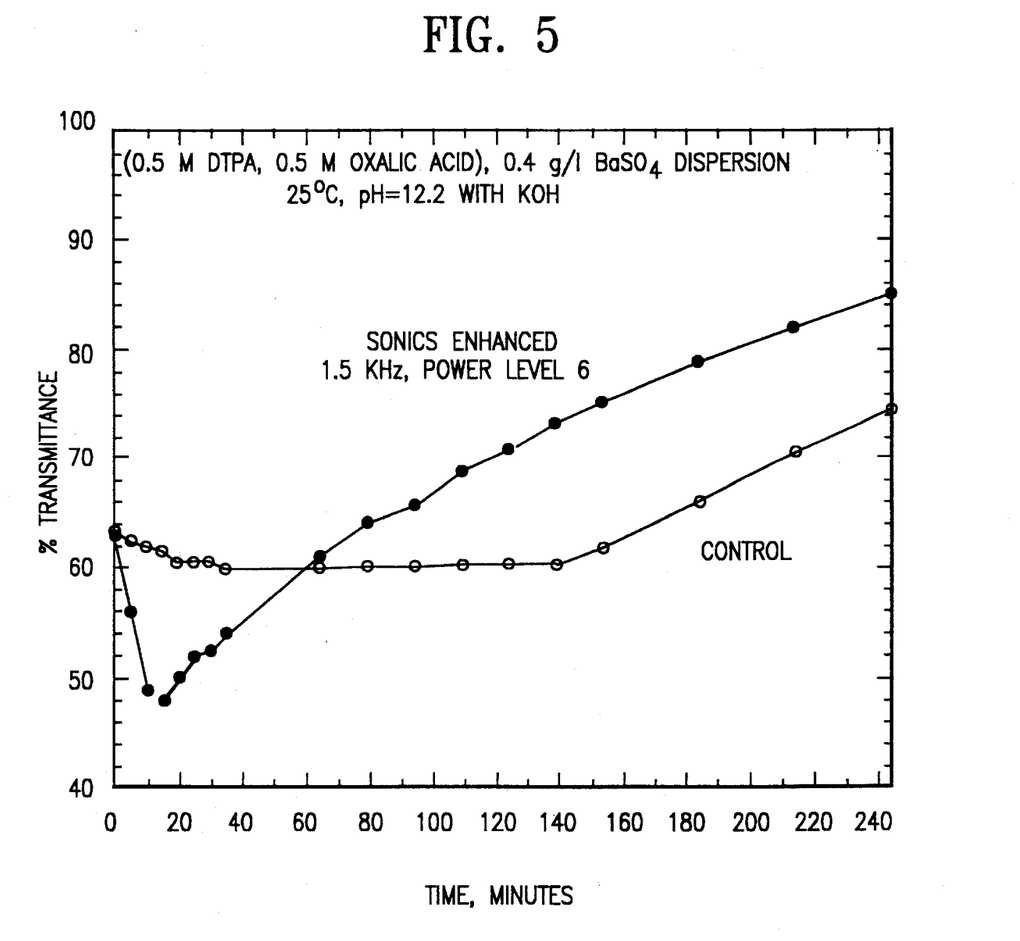
FIG. 5 illustrates the rate of dissolution of barium sulfate using a solvent containing 0.5M DTPA and 0.5M salicylic acid at a pH of 12.2 while simultaneously transmitting sonic energy through the solvent at a frequency of 1.5 KHz and a power level of 6 (60% of power).

FIG. 5 shows the rate of dissolution of barium sulfate using an aqueous DTPA/salicylic acid solvent with and without low frequency sonic energy. The results show a significant increase in the rate of dissolution of barium sulfate and an increase in the amount of barium sulfate dissolved.

Figure 6:
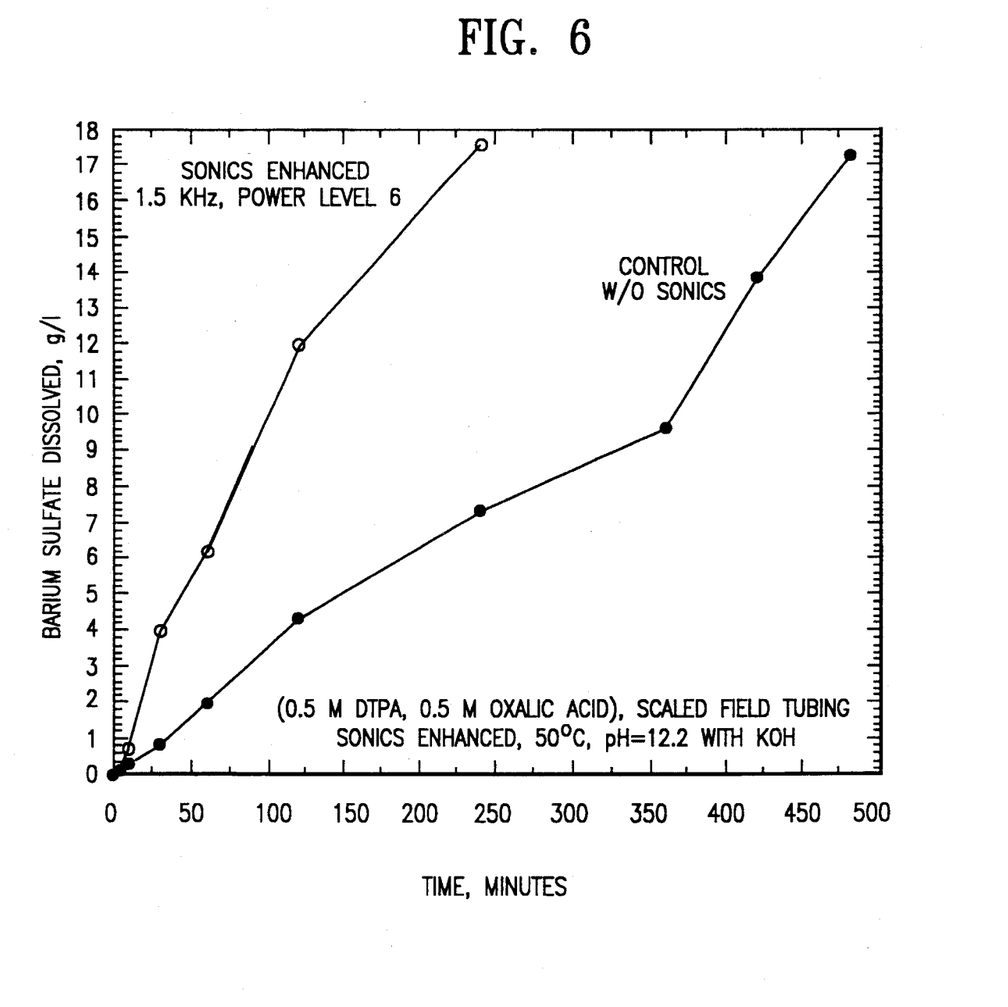
FIG. 6 illustrates the rate of dissolution of barium sulfate in field tubing using a DTPA/oxalic acid solvent while simultaneously transmitting sonic energy through the solvent having a frequency of 1.5 KHz and a power level of 6 (60% of power).
Figure 7:
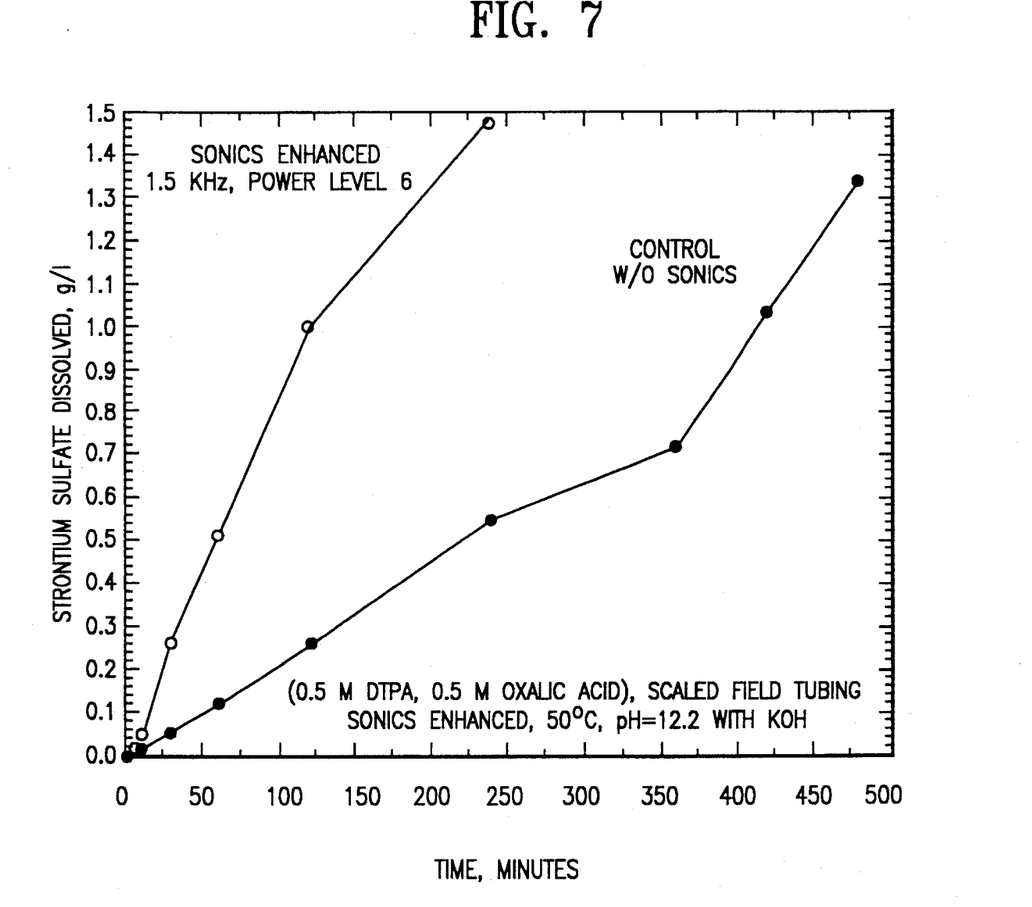
FIG. 7 illustrates the rate of dissolution of strontium sulfate in field tubing using a DTPA/oxalic acid solvent and simultaneously transmitting sonic energy through the solvent containing solvent having a frequency of 1.5 KHz and a power level of 6 (60% of power).
Figure 8:
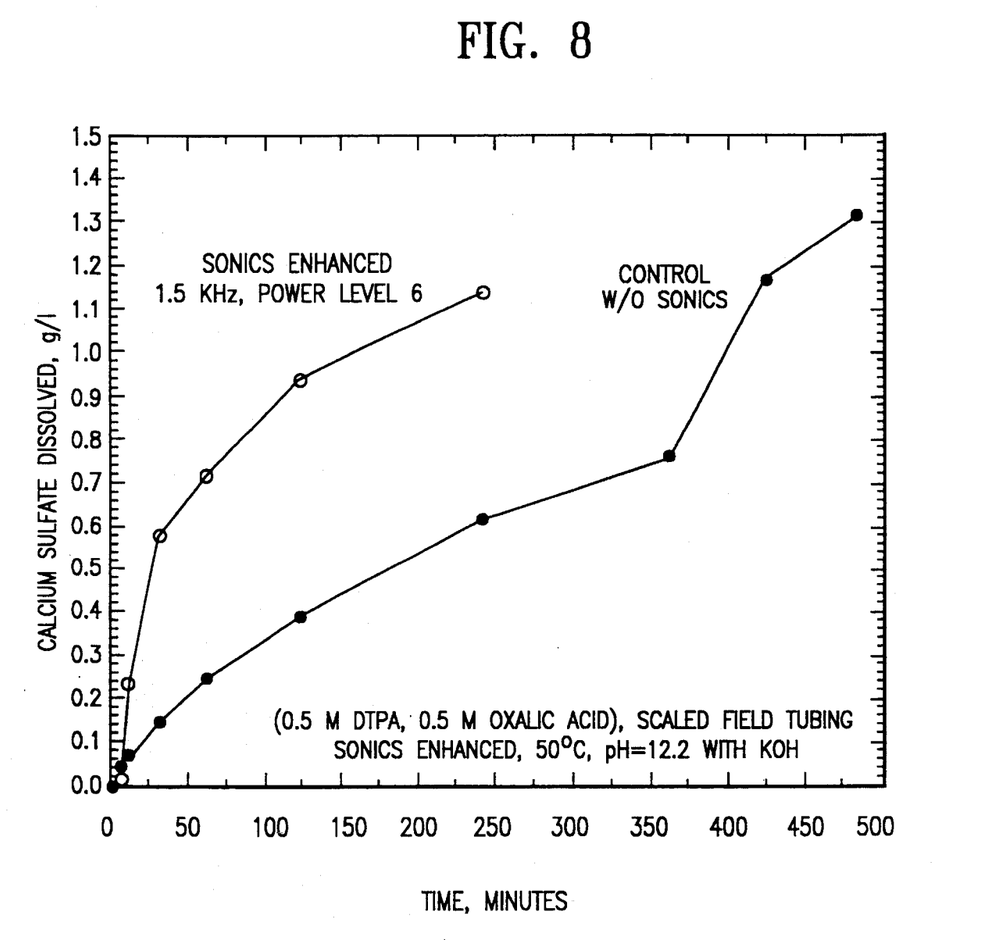
FIG. 8 illustrates the rate of dissolution of calcium sulfate in field tubing using a DTPA/oxalic acid solvent while simultaneously transmitting sonic energy through the solvent having a frequency of 1.5 KHz and a power level of 6 (60% of power).

We also evaluated the rate of dissolution of barium sulfate, strontium sulfate and calcium sulfate scale in field tubing using sonic energy having a frequency of 1.5 KHz at a power level of 6 (60% of power) using a DTPA/oxalic acid solvent at 50° C. and a pH of 12.2. Heavy scale and tar deposits were completely removed between 2 and 3 hours with sonic enhancement at 50° C. Most of the scale and tar remains after 6 hours with stirring only at 50° C. As shown in FIGS. 6 and 7, low frequency sonic energy improves dissolution of barium and strontrum sulfate scales (in the field tubing) by a factor of two. As shown in FIG. 8, low frequency sonic energy improves dissolution of calcium sulfate scale in the field tubing by a factor of 1.75. These results show that the use of a solvent enhanced with low frequency sonic energy significantly increases the rate of dissolution of scale in field tubing compared to use of a solvent without sonic energy.

Figure 9:
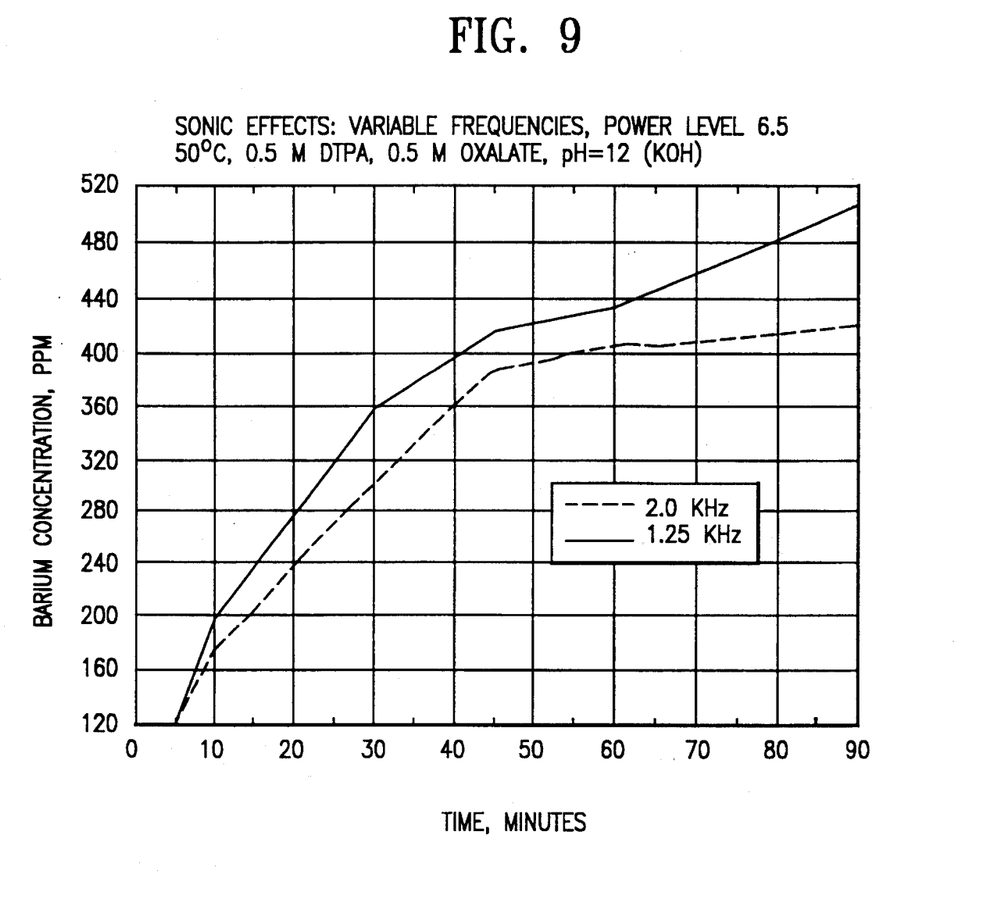
FIG. 9 illustrates the effect of sonic energy at a level of 1.25 KHz and 2.0 KHz on the rate of dissolution of barium sulfate using a DTPA/oxalic solvent at a power level of 6.5 and a pH of 12.
Figure 10:
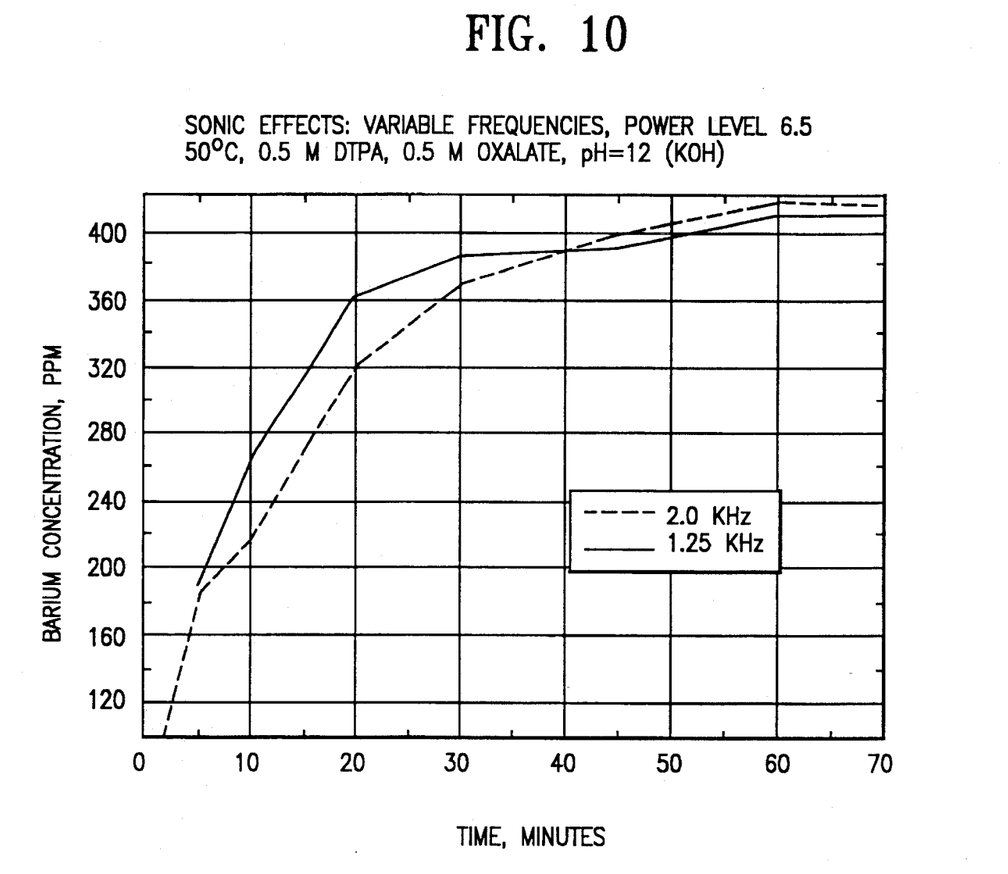
FIG. 10 illustrates the effect of sonic energy at a level of 1.25 KHz and 2.0 KHz on the rate of dissolution of barium sulfate using a EDTA/oxalate acid solvent at a power level of 6.5 and a pH of 12.

We also evaluated the effect of sonic energy frequency on the rate of barium sulfate at frequencies of 1.25 KHz and 2.0 KHz. As shown in FIG. 9, the results show that there is a significant increase in the rate of dissolution of barium sulfate (amount of barium dissolved) by the aqueous DTPA solvent using the lower frequency of 1.25 KHz. As shown in FIG. 10, the results show that there is a significant increase in the rate of dissolution of barium sulfate by the aqueous EDTA solvent up to forty (40) minutes for the lower frequency of 1.25 KHz and then dissolution tapers off to a constant value for both frequencies. These results show that the use of the lower frequency (1.25 KHz) significantly increases the rate of dissolution of barium sulfate scale using an aqueous DTPA sulfate scale using an aqueous DTPA or EDTA solvent when compared to the use of a frequency of 2.0 KHz.

The sonic energy for the above tests was generated by a "T"-Motor™ transducer manufactured by Sonic Research Corporation as discussed above. The T-Motor™ consists of a magnetostrictive material in the form of rods compressed together and wrapped with a wire coil. The rods comprise 90% iron, 5% terbium and 5% dysprosium sold under the trade designation "Terfenol D" by Edge Technologies, Inc. The Terfenol D rod is the only material known that can produce variable frequency, and withstand high temperature and pressure. The rods vibrate length wise when a DC current flows through the coil. The induced magnetic field causes the rods to expand and contract, i.e. magnetostrictive motion. This motion, or vibration, generates an acoustic wave or sonic energy having a frequency in the range of 0–50 KHz which extends forward from the T-Motor™ for some distance and the acoustic pressure wave is estimated at a magnitude of 3,000 psi. The T-Motor™ or transducer is powered by a standard frequency generator and a power amplifier. For all tests, the power level was set at 6 (60% of power). The frequency of the vibrations transmitted through the scale solvent for dissolving alkaline earth sulfate scale in the above tests was in the range of 1.25 to 6.5 KHz, preferably less than 2.0 KHz and most preferably 1.25 KHz. The T-Motor™ is only about 60 cm. in length and about 5 cm. in diameter and can easily be lowered down wellbore tubing for transmitting sonic energy through a scale-removing solvent contained in the wellbore.

We claim:

1. A method for removing alkaline earth scale in a wellbore penetrating a subterranean formation for the production of fluids comprising contacting the scale with an aqueous solution having a pH of about 8 to about 14 and comprising a chelating agent comprising a polyaminopolycarboxylic acid or salt of said an acid present in a concentration of from 0.1M to 1.0M, and a synergist anion selected from the group consisting of oxalate anions, thiosulfate anions, salicylate anions and nitriloacetate anions present in a concentration of from 0.1M to 1.0M to dissolve the scale, transmitting sonic energy having a frequency of about 1.25 kHz through the aqueous solution and subsequently removing the dissolved scale from the wellbore, said sonic energy generated by a magnetostrictive transducer lowered into the wellbore.

2. A method according to claim 1 wherein the chelating agent comprises DTPA.

3. A method according to claim 1 wherein the pH of the solution is from 11 to 13.

4. A method according to claim 1 wherein the chelating agent comprises EDTA.

5. A method according to claim 1 wherein the scale consists of barium sulfate, strontium sulfate or calcium sulfate and mixtures thereof.

6. A method according to claim 1 in which the scale comprises barium sulfate scale.

7. A method according to claim 1 in which the pH of the solution is about 12.

8. A method according to claim 1 in which the solution is brought to the specified pH by the addition of a potassium base.

9. A method according to claim 1 in which the scale is contacted with the solution at a temperature from 25° C. to 100° C.

* * * * *